(12) United States Patent
O'Connor et al.

(10) Patent No.: US 11,058,946 B2
(45) Date of Patent: Jul. 13, 2021

(54) SYSTEM AND METHOD FOR MANAGING EVENT DATA IN A MULTI-PLAYER ONLINE GAME

(71) Applicant: MZ IP Holdings, LLC, Palo Alto, CA (US)

(72) Inventors: John O'Connor, Sunnyvale, CA (US); Nathan Spencer, Redwood City, CA (US); Garth Gillespie, Palo Alto, CA (US); Timothy Wong, Sunnyvale, CA (US)

(73) Assignee: MZ IP HOLDINGS, LLC, Palo Alto, CA (US)

( * ) Notice: Subject to any disclaimer, the term of this patent is extended or adjusted under 35 U.S.C. 154(b) by 285 days.

(21) Appl. No.: 15/825,581

(22) Filed: Nov. 29, 2017

(65) Prior Publication Data

US 2018/0193742 A1 Jul. 12, 2018

Related U.S. Application Data

(60) Provisional application No. 62/445,364, filed on Jan. 12, 2017.

(51) Int. Cl.
*A63F 13/35* (2014.01)
*A63F 13/55* (2014.01)
(Continued)

(52) U.S. Cl.
CPC ............ *A63F 13/35* (2014.09); *A63F 13/335* (2014.09); *A63F 13/34* (2014.09); *A63F 13/352* (2014.09);
(Continued)

(58) Field of Classification Search
CPC .......... A63F 13/48; A63F 13/31; A63F 13/33; A63F 13/87
See application file for complete search history.

(56) References Cited

U.S. PATENT DOCUMENTS 6,020,885 A * 2/2000 Honda ................... G06Q 10/10
375/E7.077
8,133,116 B1 * 3/2012 Kelly ..................... A63F 13/85
463/1
(Continued)

FOREIGN PATENT DOCUMENTS

EP 1158741 A2 11/2001

OTHER PUBLICATIONS

Diot, et al., "A Distributed Architecture for Multiplayer Interactive Applications on the Internet," IEEE Network, IEEE Service Center, 1999, 6-15.
(Continued)

*Primary Examiner* — William H McCulloch, Jr.
(74) *Attorney, Agent, or Firm* — Goodwin Procter LLP

(57) ABSTRACT

Implementations of the present disclosure are directed to a computer-implemented method, a system, and an article for managing event data in a multi-player online game. The method can include, for example, receiving user input at a plurality of client devices for a multi-player online game that includes a virtual environment; generating user-initiated events for the online game on the client devices based on the user input; distributing any user-initiated events generated on each client device to other client devices from the plurality of client devices; determining at each client device a plurality of derived game events based on the user-initiated events; storing on each client device the user-initiated events and the derived game events in one or more event queues; and determining at each client device a state of the virtual environment over time, according to the stored user-initiated events and the derived game events.

20 Claims, 4 Drawing Sheets

(51) Int. Cl.
    *A63F 13/335*     (2014.01)
    *A63F 13/352*     (2014.01)
    *A63F 13/34*     (2014.01)
    *H04L 29/08*     (2006.01)
    *A63F 13/358*     (2014.01)

(52) U.S. Cl.
    CPC ............ *A63F 13/358* (2014.09); *A63F 13/55* (2014.09); *H04L 67/26* (2013.01); *H04L 69/329* (2013.01); *A63F 2300/5533* (2013.01)

(56) References Cited

U.S. PATENT DOCUMENTS

| | | | |
|---|---|---|---|
| 8,370,423 | B2 | 2/2013 | Ozzie et al. |
| 8,529,354 | B1* | 9/2013 | Henrick ............ A63F 13/69 463/42 |
| 8,571,991 | B2* | 10/2013 | Saunders ............ G06F 7/58 463/25 |
| 8,808,093 | B1* | 8/2014 | Reynolds ............ A63F 13/795 463/42 |
| 8,959,154 | B2* | 2/2015 | Saunders ............ G06F 7/58 709/203 |
| 9,092,932 | B2* | 7/2015 | Saunders ............ G06F 7/58 |
| 9,609,087 | B2* | 3/2017 | Dunn ............ H04L 67/42 |
| 9,682,315 | B1* | 6/2017 | Miller ............ A63F 13/12 |
| 9,895,609 | B2* | 2/2018 | Miller ............ A63F 13/335 |
| 9,914,052 | B2* | 3/2018 | Munson ............ A63F 13/35 |
| 9,937,414 | B2* | 4/2018 | Mahajan ............ G06F 17/30575 |
| 10,413,820 | B2* | 9/2019 | Miller ............ A63F 13/12 |
| 10,449,454 | B2* | 10/2019 | Walsh ............ A63F 13/5255 |
| 10,456,686 | B2* | 10/2019 | Patton ............ A63F 13/67 |
| 2002/0194269 | A1 | 12/2002 | Owada et al. |
| 2005/0228856 | A1 | 10/2005 | Swildens et al. |
| 2007/0168516 | A1 | 7/2007 | Liu et al. |
| 2009/0187669 | A1 | 7/2009 | Thornton et al. |
| 2011/0263332 | A1 | 10/2011 | Mizrachi |
| 2011/0312423 | A1* | 12/2011 | Mosites ............ G06Q 10/00 463/42 |
| 2011/0320401 | A1* | 12/2011 | Mahajan ............ G06F 17/30575 707/614 |
| 2013/0005473 | A1* | 1/2013 | Bethke ............ A63F 13/795 463/42 |
| 2013/0097238 | A1* | 4/2013 | Rogers ............ H04L 67/141 709/204 |
| 2013/0339473 | A1* | 12/2013 | McCaffrey ............ H04L 47/62 709/216 |
| 2014/0189676 | A1* | 7/2014 | Mahajan ............ G06F 8/43 717/170 |
| 2014/0349769 | A1* | 11/2014 | Reynolds ............ A63F 13/795 463/42 |
| 2017/0004678 | A1* | 1/2017 | Leydon ............ G07F 17/3255 |
| 2017/0287266 | A9* | 10/2017 | Leydon ............ G07F 17/3225 |
| 2018/0193742 | A1* | 7/2018 | O'Connor ............ H04L 69/329 |
| 2018/0196666 | A1* | 7/2018 | Spencer ............ A63F 13/60 |
| 2018/0207528 | A1* | 7/2018 | Palikuqi ............ A63F 13/61 |
| 2018/0337989 | A1* | 11/2018 | Gillespie ............ H04L 67/1095 |
| 2019/0299103 | A1* | 10/2019 | Lee ............ G06Q 50/01 |

OTHER PUBLICATIONS

Fujimoto, et al., "Parallel and distributed simulation systems," Proceedings of the 2001 Winter Simulation Conference. WSC '01, 2001, IEEE 1:147-157.

Int'l Search Report and Written Opinion of the ISA/EP in PCT/US2018/012909; dated Apr. 24, 2018; 17 pgs.

U.S. Appl. No. 15/967,984, filed May 1, 2018, System and Method for Synchronizing Data Betweem Computer Devices, Gillespie et al.

"Rsync—Wikipedia," Jan. 15, 2015 (Jan. 15, 2015), Retrieved from the Internet on Mar. 1, 2018 at: <https://en.wikipedia.org/w/index.php?title=Rsync&oldid=642639739>.

Demaree, David. "Git for Humans". A book Apart. Sep. 19, 2016. pp. 1-49.

Int'l Search Report and Written Opinion of the ISA/EP in PCT/US2018/030398; dated Jul. 13, 2018; 14 pgs.

* cited by examiner

SYSTEM AND METHOD FOR MANAGING EVENT DATA IN A MULTI-PLAYER ONLINE GAME

CROSS-REFERENCE TO RELATED APPLICATIONS

This application claims the benefit of U.S. Provisional Patent Application No. 62/445,364, filed Jan. 12, 2017, the entire contents of which are incorporated by reference herein.

BACKGROUND

The present disclosure relates to multi-player online games and, in particular, to systems and methods for managing event data in a multi-player online game.

In general, a multi-player online game can be played by hundreds of thousands or even millions of players who use client devices to interact with a virtual environment for the online game. The players are typically working to accomplish tasks, acquire assets, or achieve a certain score in the online game. Some games require or encourage players to form groups or teams that can play against other players or groups of players.

The state of a multi-player online game and/or its virtual environment can change over time as players provide input to the game and various events unfold as a result of the input. It is desirable for the state of the game to be consistent for all players at any given time, so each player is kept apprised of game activity and no players have an unfair advantage.

SUMMARY

Implementations of the systems and methods described herein can be used to manage event data in a multi-player online game. The event data can include game events that are created when users (alternatively referred to herein as "players") provide input to client devices for interacting with the online game or a virtual environment for the online game. Alternatively or additionally, at least a portion of the game events can be created by a server in communication with the client devices. The event data can also include derived game events, which can be or include, for example, an event that is predicted to occur as a result of one or more game events and/or other derived game events. In various examples, each game event and each derived game event is scheduled to occur at a respective time in the online game. A server and a plurality of client devices can store the event data in respective queues and update a state of the online game as the events occur. The events are preferably processed deterministically, such that the state of the game is identical at any given time across the client devices and the server. This ensures that all players experience the same state of the game as time progresses.

Examples of the systems and methods described herein can be used to manage event data and determine a consistent state for the online game or a portion thereof. For example, when players are interacting with or competing against other players (e.g., in a battle or combat scenario in an adventure game), it is important for the state of the game to be the same or identical for each of the players, as time progresses in the game. The state of the game can be or include, for example, a condition of a virtual environment for the game, current positions of virtual items, characters, or players in the game, and/or current assets owned or held by the players. In some examples, the game state includes an indication of certain properties for objects or characters in the game. The game state can include, for example, an indication of whether objects in the virtual environment are selectable, movable, damageable, and/or transformable. Advantageously, the systems and methods are able to provide a consistent game state across all client devices for the entire game or for one or more portions of the game (e.g., during a battle or other competition among players). This promotes fair game play and prevents any players from having an unfair advantage. The approach also makes it easier for users who have a poor connection to the server (e.g., due to high latency) to participate in the game, for example, because the user's client device can determine the game state on its own, without relying on the server for the game state determination.

In one aspect, the subject matter described in this specification relates to a computer-implemented method. The method includes: receiving user input at a plurality of client devices for a multi-player online game having a virtual environment; generating user-initiated events (e.g., game events) for the online game on the client devices based on the user input; distributing any user-initiated events generated on each client device to other client devices from the plurality of client devices; determining at each client device a plurality of derived game events based on the user-initiated events; storing on each client device the user-initiated events and the derived game events in one or more event queues; and determining at each client device a state of the virtual environment over time, according to the stored user-initiated events and the derived gam events.

In certain examples, users interact with the virtual environment using the client devices. Each user-initiated event can include a time at which the user-initiated event will occur in the virtual environment. Distributing the user-initiated events can include: sending the user-initiated events from the client devices to a server; and receiving at each client device, from the server, the user-initiated events generated by other client devices from the plurality of client devices. After distributing the user-initiated events, each client device can include each user-initiated event. Each derived game event can include a time at which the derived game event will occur in the virtual environment.

In some implementations, the user-initiated events and the derived game events are stored on each client device according to times for the user-initiated events and the derived game events. Each client device can make an identical determination of the state of the virtual environment over time. The method can include displaying at least a portion of the virtual environment on each client device. The method can include: receiving at a server the user-initiated events from the client devices; determining at the server the plurality of derived game events based on the user-initiated events; storing on the server the user-initiated events and the derived game events in one or more server event queues; and determining on the server the state of the virtual environment over time, according to the stored user-initiated events and the derived game events.

In another aspect, the subject matter described in this specification relates to a system. The system includes one or more computer processors programmed to perform operations including: receiving user input at a plurality of client devices for a multi-player online game having a virtual environment; generating user-initiated events (e.g., game events) for the online game on the client devices based on the user input; distributing any user-initiated events generated on each client device to other client devices from the plurality of client devices; determining at each client device a plurality of derived game events based on the user-initiated events; storing on each client device the user-initiated events and the derived game events in one or more event queues; and determining at each client device a state of the virtual environment over time, according to the stored user-initiated events and the derived game events.

In certain instances, users interact with the virtual environment using the client devices. Each user-initiated event can include a time at which the user-initiated event will occur in the virtual environment. Distributing the user-initiated events can include: sending the user-initiated events from the client devices to a server; and receiving at each client device, from the server, the user-initiated events generated by other client devices from the plurality of client devices. After distributing the user-initiated events, each client device can include each user-initiated event. Each derived game event can include a time at which the derived game event will occur in the virtual environment.

In some examples, the user-initiated events and the derived game events can be stored on each client device according to times for the user-initiated events and the derived game events. Each client device can make an identical determination of the state of the virtual environment over time. The operations can include: receiving at a server the user-initiated events from the client devices; determining at the server the plurality of derived game events based on the user-initiated events; storing on the server the user-initiated events and the derived game events in one or more server event queues; and determining on the server the state of the virtual environment over tune, according to the stored user-initiated events and the derived gam events.

In another aspect, the subject matter described in this specification relates to an article. The article includes a non-transitory computer-readable medium having instructions stored thereon that, when executed by one or more computer processors, cause the computer processors to perform operations including: receiving user input at a plurality of client devices for a multi-player online game having a virtual environment; generating user-initiated events (e.g., game events) for the online game on the client devices based on the user input; distributing any user-initiated events generated on each client device to other client devices from the plurality of client devices; determining at each client device a plurality of derived game events based on the user-initiated events; storing on each client device the user-initiated events and the derived game events in one or more event queues; and determining at each client device a state of the virtual environment over time, according to the stored user-initiated events and the derived game events.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims

DETAILED DESCRIPTION

Figure 1:
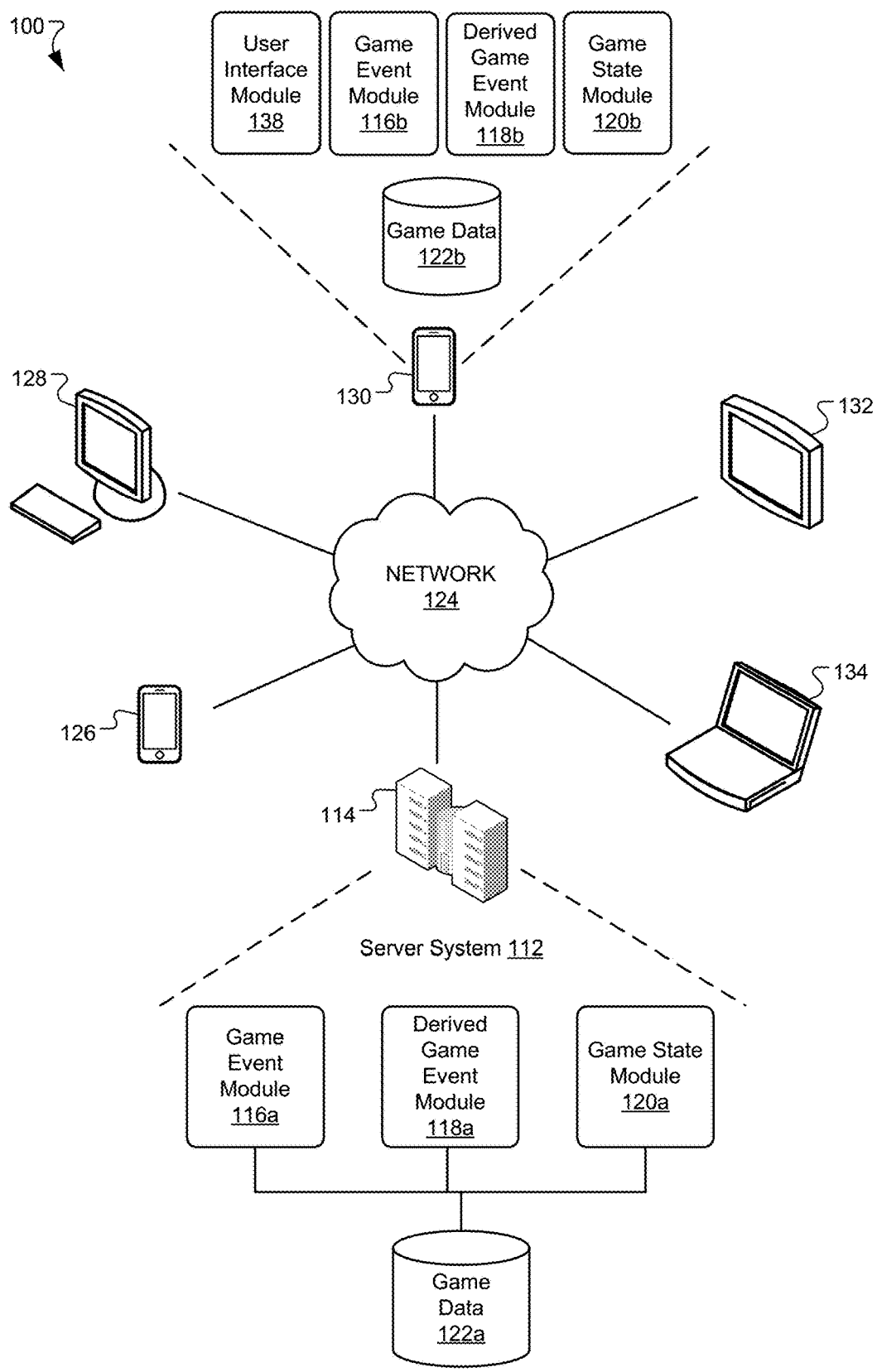
FIG. 1 is a schematic diagram of an example system for managing event data in a multi-player online game.

FIG. 1 illustrates an example system 100 for managing event data and maintaining a consistent game state across client devices for a multi-player online game. A server system 112 provides functionality for processing game events, computing derived game events, updating the game state, and/or monitoring game play, over time. The server system 112 includes software components and storage devices or databases that can be deployed at one or more data centers 114 in one or more geographic locations, for example. The server system 112 software components can include, for example, a game event module 116a, a derived game event module 118a, and a game state module 120a. The software components can include subcomponents that can execute on the same or on different individual data processing apparatus. The server system 112 databases can include, for example, a game data database 122a. The storage devices can reside in one or more physical storage systems. The software components and data will be further described below.

An application, such as, for example, a web-based application, can be provided as an end-user application to allow users to interact with the server system 112. The end-user application can be accessed through a network 124 (e.g., the Internet) by users of client devices, such as a smart phone 126, a personal computer 128, a smart phone 130, a tablet computer 132, and a laptop computer 134. Other client devices are possible. Each client device can include suitable software components and storage devices or databases for providing game functionality. The client device software components can include, for example, a user interface module 138, a game event module 116b, a derived game event module 118b, and a game state module 120b. The storage or database components can include a game data database 122b. While FIG. 1 depicts the user interface module 138, the game event module 116b, the derived game event module 118b, the game state module 120b, and the game data database 122b as being associated with the client device 130, it is understood that each of the client devices 126, 128, 130, 132, and 134 can include the user interface module 138, the game event module 116b, the derived game event module 118b, the game state module 120b, and/or the game data database 122b.

Figure 2:
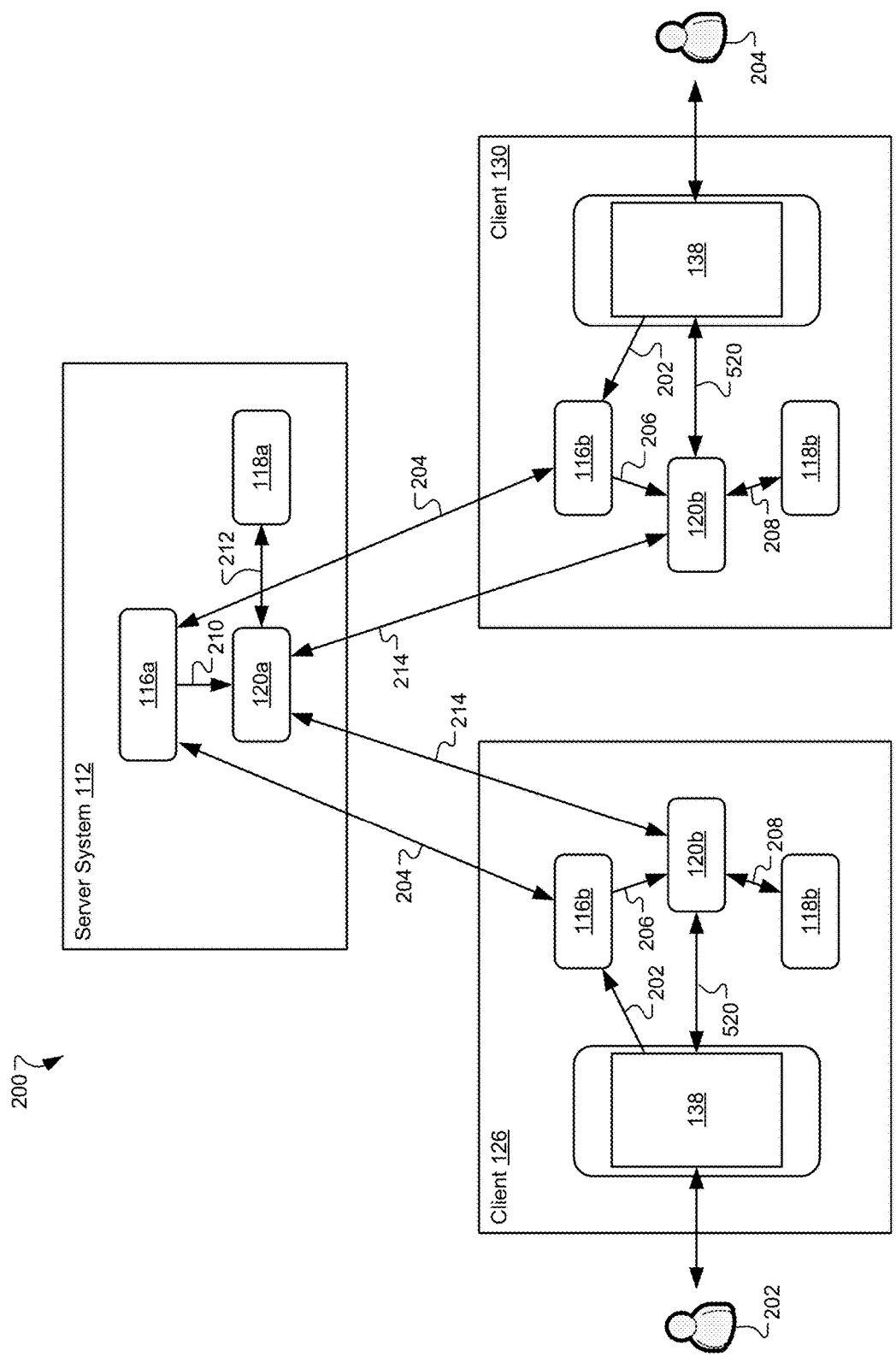
FIG. 2 is a schematic diagram of an example system in which two client devices interact with a server for a multi-player online game.

FIG. 2 depicts an example system 200 in which two users 202 and 204 use respective client devices 126 and 130 to interact with the server system 112 in an online game. Each of the users 202 and 204 can provide input to the respective client devices 126 and 130. The input can be or include, for example, a tap or swipe on a touch screen, a point and click with a mouse, and/or one or more entries on a keyboard. Data corresponding to the input is sent from the user interface module 138 along a path 202 to the game event module 116b, which determines and/or manages game events for the game based on the user input. The game events are generally actions or movements taken by a player or a player's character or avatar in the virtual environment for the online game. In some implementations, at least a portion of the game events can be generated on the server system 112. For example, the server system 112 can create game events that occur randomly or at specific times and/or places in the virtual environment. The game events generated on the client devices 126 and 130 and/or on the server system 112 can be or include, for example, a player movement, an interaction with another player, a deployment of resources (e.g., soldiers, weapons, or defenses), an interaction with a virtual object, and/or an interaction with a character in the virtual environment. Other game events are possible.

In preferred examples, game events generated on each client device (and/or on the server system 112) are shared with the other client device and any other client devices participating in the online game. For example, the game events can be sent from the game event module 116b on each client device 126 or 130 along a path 204 to the game event module 116a on the server 112. The game event module 116a on the server 112 can forward each game event (generated on the client devices 126 and 130 and/or on the server system 112) to the game event modules on the other client devices (e.g., using the path 204). As additional game events are generated during further game play and are sent to the game event module 116a on the server 112, the additional game events can be distributed to the other client devices. In this way, each client device 126 and 130 can obtain a complete set of game events generated by all the client devices and/or any servers participating in the game or a portion thereof.

In certain implementations, each game event can be associated with a time at which the event is scheduled to occur. When the scheduled time is reached, the game event module 116b on each client device 126 or 130 can forward the game event along a path 206 to the game state module 120b. The game state module 120b can update a state of the game according to the game event. For example, if the game event involves moving a position of a player at a certain time, the game state module 120b can update the state of the game by moving the position of the player at that time.

Additionally or alternatively, each game event can trigger certain derived game events for the online game. Derived game events can be or include, for example, movement of an object or character in the virtual environment, a change in condition of an object or character in the virtual environment, the addition of an object (e.g., a coin or other reward) or character (e.g., a new soldier) in the virtual environment, and/or the removal of an object (e.g., a destroyed building) or character (e.g., a killed soldier) in the virtual environment. For example, when a player changes position in the virtual environment, a virtual object may appear in the virtual environment or other objects (e.g., virtual characters, people, or animals) may move in response to the player movement. Such derived game events can be determined on the client devices 126 and 130 using the derived game event module 118b. When the game state module 120b receives a game event from the game event module 116b, for example, the game event can be forwarded along a path 208 to the derived game event module 118b. Alternatively or additionally, the game event can be forwarded directly from the game event module 116b to the derived game event module 118b. The derived game event module 118b can then determine any derived game events corresponding to the game event and can schedule times at which such derived game events will occur in the game. Alternatively or additionally, the derived game event module 118b can recalculate or delete any derived game events that are no longer predicted to occur in the game, for example, due to other intervening game events or derived game events. When a scheduled time for a derived game event is reached, the derived game event module 118b can send the derived game event along the path 208 to the game state module 120b. The game state module 120b can update the game state according to the derived game event.

When the game state module 120b updates the game state, according to the game events and the derived game events, the game state module 120b can send the updated game state to the user interface module 138. A rendering of the updated game state and/or the virtual environment can be generated by the user interface module 138 and presented to the users 202 and 204 of the client devices 126 and 130. The rendering can include, for example, text, images, video, audio, and/or haptic feedback. Each of the users 202 and 204 can respond to the updated rendering of the game state by providing further input to the user interface module 138. The further input can be processed and used to further update the game state, as described herein.

In various examples, as the client devices 126 and 130 update the game state according to the game events and the derived game events, the server 112 can update the server's version of the game state by processing the game events and the derived game events. For example, when a game event is scheduled to occur, the game event module 116a on the server 112 can forward the game event along a path 210 to the game state module 120a. The game state module can update the state of the game according to the game event. Additionally or alternatively, the game event can be forwarded along a path 212 to the derived game event module 118a, which can determine any derived game events corresponding to the game event. When a scheduled time for a derived game event is reached, the derived game event module 118a can send the derived game event along the path 212 to the game state module 120a. The game state module 120a can update the game state according to the derived game event.

In various examples, the server's version of the game state can be an official version of the game state and can be used to monitor or confirm the game state on each client device. The server's version of the game state can be used, for example, to prevent any cheating occurring on the client devices 126 and 130 or to update the game state on the client devices 126 and 130. For example, the server 112 can compare the server's listing of past, present, and/or future game events and/or derived game events with listings of past, present, and/or future game events and/or derived game events on the client devices 126 and 130. Additionally or alternatively, the server 112 can use a path 214 to compare the server's version of the game state with the game states determined by the client devices 126 and 130. By inspecting events and/or the game states on the client devices 126 and 130, the server 112 can verify that the events are permissible and within any rules of the game and/or that the game states are accurate. Without this independent check by the server 112, for example, hackers could generate and submit malicious and/or fraudulent events in an attempt to gain an unfair advantage and/or cheat at the game.

The server's official version of the game state can also be used to accommodate client devices that arrive late to the game. With prior approaches, to be brought up-to-date, a late-arriving client device could be required to process all events that occurred in the game or a portion thereof prior to the arrival of the client device. With the systems and methods described herein, however, the server 112 can send a snapshot of the current game state to the late-arriving client device, such that the client device can be synchronized with the game and/or other client devices. This greatly facilitates the process of adding any late-arriving client devices to the game or portion thereof.

In preferred implementations, the client devices 126 and 130 and the server 112 are configured to manage and process event data in a consistent manner, such that each of the client devices 126 and 130 and the server 112 arrive at an identical game state after each event is processed. To achieve this consistency and uniformity of the game state across all client devices and the sever 112, the game event modules 116a and 116b, the derived game event modules 118a and 118b, and the game state modules 120a and 120b can be configured to process events and update the game state deterministically. This can be achieved, for example, by using a consistent set of rules for processing events across all devices and/or by avoiding random events or outcomes, so that each event is determined and processed identically. With such an approach, each event can have an identical influence on the game state at each device, including the client devices 126 and 130 and the server 112. To ensure a consistent timing of events, a game clock can be synchronized across the server 112 and the client devices 126 and 130 (and any other client devices), so that all devices are set to the same time.

Figure 3:
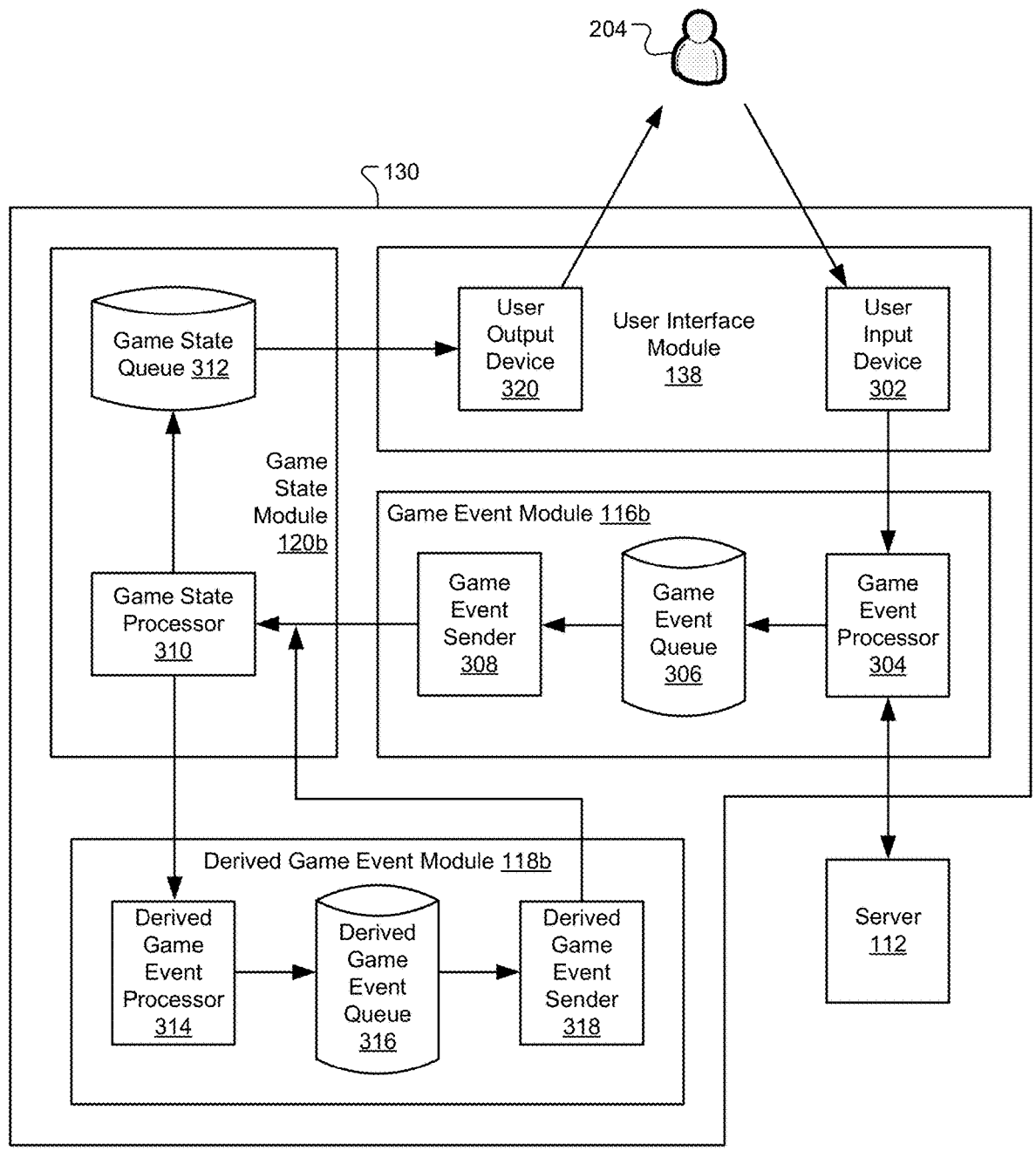
FIG. 3 is a schematic diagram of an example method of managing event data on a client device for a multi-player online game.

Referring to FIG. 3, in various examples, the client device 130 uses the user interface module 138, the game event module 116b, the derived game event module 118b, and the game state module 120b to process and/or manage event data for the online game. The user 204 can provide input to a user input device 302 of the user interface module 138. The user input device 302 can be or include, for example, a touch screen, a keyboard, a mouse, a joystick, or other game controller. The user input device 302 can process the user input and generate data corresponding to the user input. This data, which can be referred to herein as user input data, can be or include, for example, information derived from or describing the user input and/or a game event for the online game. The user input data can be sent from the user input device 302 to a game event processor 304 in the game event module 116b. Additionally or alternatively, user input data (e.g., game events) from other client devices can be sent from the server 112 to the game event processor 304. The game event processor 304 can process the user input data to determine any game events for the online game, based on the user input data and/or based on any game events generated on the server 112. For example, the game event processor 304 can determine a time at which one or more game events will occur in the online game. The one or more game events can be stored in a game event queue 306, for example, according to a unique identification number for each game event and/or according to a chronological order. A game event sender 308 can monitor a game time for the online game and can retrieve a game event from the game event queue 306 when the game event is scheduled to occur. For example, when a game time associated with the game event is reached, the game event sender 308 can remove the game event from the game event queue 306 and forward the game event to a game state processor 310 in the game state module 120b.

The game state module 120b is generally configured to update a state of the online game according to game events and derived game events. For example, when the game event sender 308 sends a game event to the game state processor 310, the game state processor 310 can determine how the game event changes the game state and can update the game state accordingly. A current state of the game can be stored in a game state queue 312, along with one or more prior states of the game. For example, the game state queue 312 can store a history of the game state. This can allow the game state to be reviewed or replayed at a later time, for example, by the user 204 and/or a game administrator.

When the game state processor 310 updates the game state according to a game event, the updated game state and/or the game event can be sent to the derived game event module 118b, which can determine and process any derived game events that occur due to the game event and/or the updated game state. For example, a derived game event processor 314 can receive the updated game state and/or the game event and determine a time at which one or more derived game events will occur in the online game, as a result of the updated game state and/or the game event. Alternatively or additionally, the derived game event processor 314 can recalculate derived game events and/or delete certain derived game events that will no longer occur, due to other intervening events. The one or more derived game events can be stored in a derived game event queue 316, for example, according to a unique identification number for each derived game event and/or according to a chronological order. A derived game event sender 318 can monitor a game time for the online game and can retrieve a derived game event from the derived game event queue 316 when the derived game event is scheduled to occur. For example, when a game time associated with the derived game event is reached, the derived game event sender 318 can remove the derived game event from the derived game event queue 316 and forward the derived game event to the game state processor 310, which can update the game state accordingly. As the game state is updated over time, additional derived game events can be processed using the derived game event module 118b and implemented into the online game using the game state module 120b. In some implementations, the derived game event module 118b can receive game events directly from the game event sender 308 and can determine and process derived game events based on the received game events.

As the game state is updated and stored in the game state queue 312, a current game state or a rendering thereof can be sent from the game state module 120b to a user output device 320 on the user interface module 138. The user output device 320 can be or include, for example, a display screen, a graphical user interface, a speaker, and/or a haptic feedback device. In preferred implementations, a rendering of the current game state can be determined by the user interface module 138 and/or the game state module 120b and provided to the user 204 using the user output device 320. In response, the user 204 can provide additional user input to the user input device 302 and any corresponding game events and/or derived game events can be determined and processed to update the game state accordingly. The process of updating the game state based on game events and derived game events can continue until the game (or a portion thereof) comes to an end.

Figure 4:
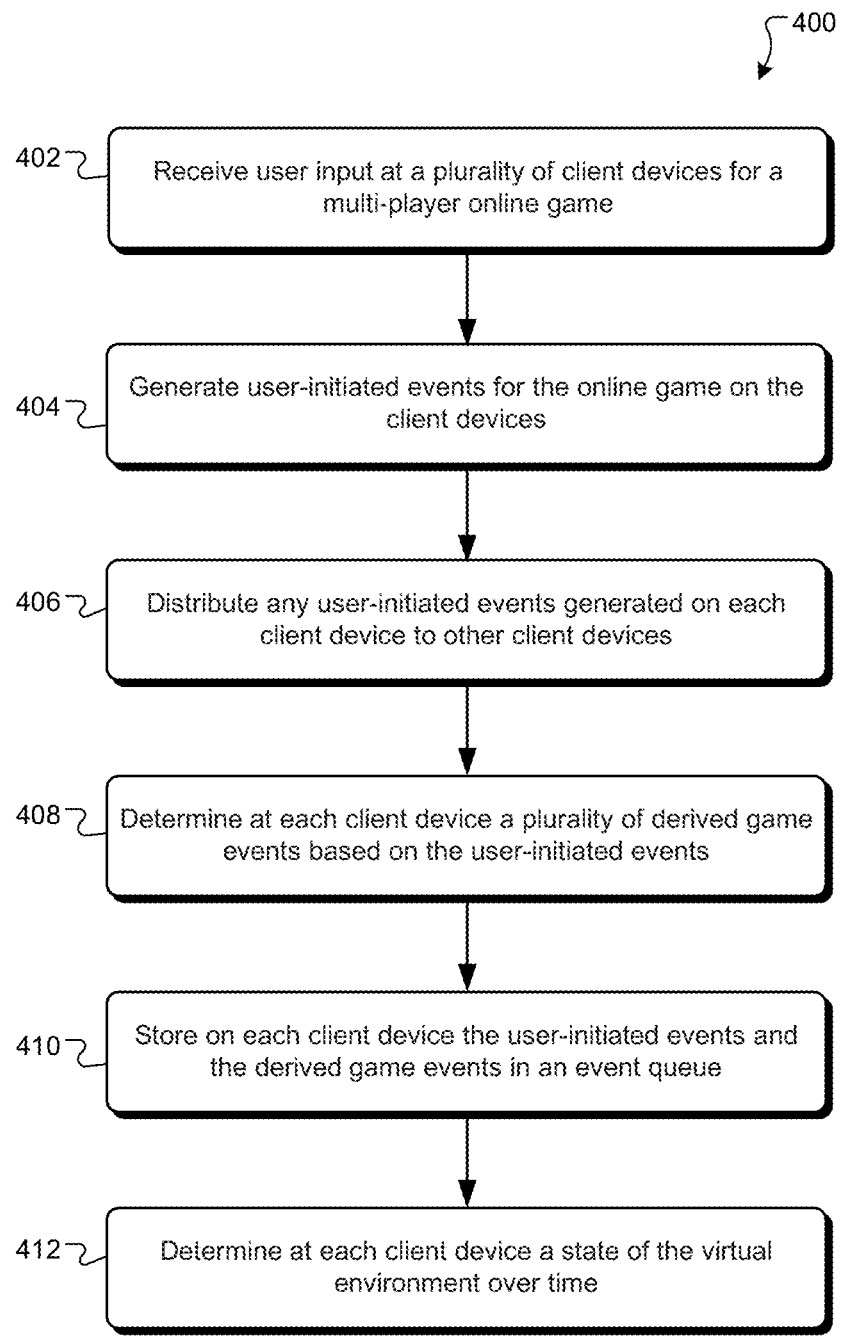
FIG. 4 is a flowchart of an example method of managing event data for a multi-player online game.

FIG. 4 illustrates an example computer-implemented method 400 of managing event data for a multi-player online game that includes a virtual environment. User input is received (step 402) at a plurality of client devices for the multi-player online game, which includes a virtual environment. User-initiated events (e.g., game events) are generated (step 404) for the online game on the client devices based on the user input. Any user-initiated events generated on each client device are distributed (step 406) to other client devices from the plurality of client devices. A plurality of predicted or derived game events are determined (step 408) at each client device, based on the user-initiated events. The user-initiated events and the derived game events are stored (step 410) on each client device in an event queue (or a plurality of event queues), for example, in a chronological order. At each client device, a state of the virtual environment is determined (step 412) over time, according to the stored user-initiated events and the derived game events.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method, comprising:
    receiving user input at a plurality of client devices for a multi-player online game comprising a virtual environment;
    generating user-initiated events for the online game on the client devices based on the user input;
    distributing any user-initiated events generated on each client device to other client devices from the plurality of client devices;
    determining at each client device a plurality of derived game events based on the user-initiated events received from the other client devices;
    storing on each client device the user-initiated events and the derived game events in one or more event queues; and
    determining at each client device a state of the virtual environment over time, according to the stored user-initiated events and the derived game events,
        wherein determining the state of the virtual environment comprises:
            synchronizing a game clock across the plurality of client devices; and
            processing each stored event on each client device when the game clock reaches a time at which the stored event is scheduled to occur in the virtual environment.

2. The method of claim 1, wherein users interact with the virtual environment using the client devices.

3. The method of claim 1, wherein each user-initiated event comprises a time at which the user-initiated event will occur in the virtual environment.

4. The method of claim 1, wherein distributing the user-initiated events comprises:
    sending the user-initiated events from the client devices to a server; and
    receiving at each client device, from the server, the user-initiated events generated by other client devices from the plurality of client, devices.

5. The method of claim 1, wherein distributing the user-initiated events comprises receiving at each client device any user-initiated events generated on other client devices from the plurality of client devices.

6. The method of claim 1, wherein each derived game event comprises a time at which the derived game event, will occur in the virtual environment.

7. The method of claim 1, wherein the user-initiated events and the derived game events are stored on each client device according to times for the user-initiated events and the derived game events.

8. The method of claim 1, wherein each client device makes an identical determination of the state of the virtual environment over time.

9. The method of claim 1, further comprising:
    displaying at least a portion of the virtual environment on each client device.

10. The method of claim 1, further comprising:
    receiving at a server the user-initiated events from the client devices;
    determining at the server the plurality of derived game events based on the user-initiated events;
    storing on the server the user-initiated events and the derived game events in one or more server event queues; and
    determining on the server the state of the virtual environment over time, according to the stored user-initiated events and the derived game events.

11. A system, comprising:
    one or more computer processors programmed to perform operations comprising:
        receiving user input at a plurality of client devices for a multi-player online game comprising a virtual environment;

generating user-initiated events for the online game on the client devices based on the user input;

distributing any user-initiated events generated on each client device to other client devices from the plurality of client devices;

determining at each client device a plurality of derived game events based on the user-initiated events received from the other client devices;

storing on each client device the user-initiated events and the derived game events in one or more event queues; and determining at each client device a state of the virtual environment over time, according to the stored user-initiated events and the derived game events, wherein determining the state of the virtual environment comprises:

synchronizing a game clock across the plurality of client devices; and processing each stored event on each client device when the game clock reaches a time at which the stored event is scheduled to occur in the virtual environment.

12. The system of claim 11, wherein users interact with the virtual environment using the client devices.

13. The system of claim 11, wherein each user-initiated event comprises a time at which the user-initiated event will occur in the virtual environment.

14. The system of claim 11, wherein distributing the user-initiated events comprises:

sending the user-initiated events from the client devices to a server; and receiving at each client device, from the server, the user-initiated events generated by other client devices from the plurality of client devices.

15. The system of claim 11, wherein distributing the user-initiated events comprises receiving at each client device any user-initiated events generated on other client devices from the plurality of client devices.

16. The system of claim 11, wherein each derived game event comprises a time at which the derived game event will occur in the virtual environment.

17. The system of claim 11, wherein the user-initiated events and the derived game events are stored on each client device according to times for the user-initiated events and the derived game events.

18. The system of claim 11, wherein each client device makes an identical determination of the state of the virtual environment over time.

19. The system of claim 11, the operations further comprising:

receiving at a server the user-initiated events from the client devices;

determining at the server the plurality of derived game events based on the user-initiated events;

storing on the server the user-initiated events and the derived game events in one or more server event queues; and determining on the server the state of the virtual environment over time, according to the stored user-initiated events and the derived game events.

20. An article, comprising:

a non-transitory computer-readable medium having instructions stored thereon that, when executed by one or more computer processors, cause the computer processors to perform operations comprising:

receiving user input at a plurality of client devices for a multi-player online game comprising a virtual environment;

generating user-initiated events for the online game on the client devices based on the user input;

distributing any user-initiated events generated on each client device to other client devices from the plurality of client devices;

determining at each client device a plurality of derived game events based on the user-initiated events received from the other client devices;

storing on each client device the user-initiated events and the derived game events in one inure event queues; and determining at each client device a state of the virtual environment over time, according to the stored user-initiated events and the derived game events, wherein determining the state of the virtual environment comprises:

synchronizing a game clock across the plurality of client devices; and processing each stored event on each client device when the game clock reaches a time at which the stored event is scheduled to occur in the virtual environment.

* * * * *